(12) United States Patent
Stockill (10) Patent No.: US 12,521,833 B2
(45) Date of Patent: Jan. 13, 2026

(54) TOOL MEASUREMENT APPARATUS FOR A MACHINE TOOL

(71) Applicant: RENISHAW PLC, Wotton-under-Edge (GB)

(72) Inventor: William David Stockill, Wotton-under-Edge (GB)

(73) Assignee: RENISHAW PLC, Wotton-Under-Edge (GB)

( * ) Notice: Subject to any disclaimer, the term of this patent is extended or adjusted under 35 U.S.C. 154(b) by 109 days.

(21) Appl. No.: 18/706,054

(22) PCT Filed: Nov. 1, 2022

(86) PCT No.: PCT/GB2022/052753
§ 371 (c)(1),
(2) Date: Apr. 30, 2024

(87) PCT Pub. No.: WO2023/089295
PCT Pub. Date: May 25, 2023

(65) Prior Publication Data
US 2025/0001540 A1    Jan. 2, 2025

(30) Foreign Application Priority Data

Nov. 16, 2021 (EP) ..................................... 21275159

(51) Int. Cl.
*G01V 8/12* (2006.01)
*B23Q 17/24* (2006.01)

(52) U.S. Cl.
CPC .............. *B23Q 17/24* (2013.01); *G01V 8/12* (2013.01)

(58) Field of Classification Search
CPC ................................... G01V 8/10; G01V 8/12
See application file for complete search history.

(56) References Cited

U.S. PATENT DOCUMENTS

| 6,496,273 | B1 | 12/2002 | Stimpson et al. |
| 7,312,433 | B2 | 12/2007 | Stimpson et al. |
| (Continued) | | | |

FOREIGN PATENT DOCUMENTS

| CN | 203792103 U | 8/2014 |
| CN | 213615607 U | 7/2021 |
| (Continued) | | |

OTHER PUBLICATIONS

Jan. 26, 2023 International Search Report issued in International Patent Application No. PCT/GB2022/052753.

(Continued)

*Primary Examiner* — Kevin K Pyo
(74) *Attorney, Agent, or Firm* — Oliff PLC (57) ABSTRACT

A tool measurement apparatus for a machine tool includes a transmitter portion including a light source for generating a light beam and a receiver portion including a detector for detecting the light beam, the light beam being passed from the light source to the detector along an optical path. At least one of the receiver portion and the transmitter portion includes a protection device including a gas expulsion aperture configured to expel a bleed gas supplied from an external gas source. The optical path also passes through the gas expulsion aperture. The protection device further includes a check valve located in the optical path. The bleed gas is supplied to the gas expulsion aperture through the check valve and the flow of the bleed gas through the check valve causes the check valve to adopt an open configuration defining a passageway through which the light beam can pass.

14 Claims, 5 Drawing Sheets

(56) References Cited

U.S. PATENT DOCUMENTS

| | | |
|---|---|---|
| 8,497,466 B2 | 7/2013 | Martelli et al. |
| 10,330,464 B2 | 6/2019 | Dilger et al. |
| 11,209,258 B2 | 12/2021 | Styles et al. |
| 2010/0206384 A1 | 8/2010 | Martelli et al. |
| 2018/0112967 A1 | 4/2018 | Dilger et al. |
| 2019/0376777 A1 | 12/2019 | Styles et al. |
| 2021/0381860 A1 | 12/2021 | Merrifield et al. |
| 2021/0385364 A1* | 12/2021 | Ferguson ........... B23Q 17/2485 |

FOREIGN PATENT DOCUMENTS

| | | |
|---|---|---|
| EP | 1 050 368 B1 | 1/2003 |
| EP | 1 502 699 B1 | 8/2007 |
| WO | 2009/034147 A1 | 3/2009 |
| WO | 2018/134585 A1 | 7/2018 |
| WO | 2020/183155 A1 | 9/2020 |

OTHER PUBLICATIONS

Jan. 26, 2023 Written Opinion issued in International Patent Application No. PCT/GB2022/052753.

May 12, 2022 Extended Search Report issued in European Patent Application No. 21275159.8.

* cited by examiner

TOOL MEASUREMENT APPARATUS FOR A MACHINE TOOL

The present invention relates to a tool measurement apparatus for a machine tool and in particular to improvements related to the protection of such apparatus against the ingress of machine tool contaminants, such as cutting debris and coolant fluid.

It is known to mount tool measurement apparatus, such as laser tool setters, within the enclosure of a machine tool to allow measurement of the various tools that are used to process a workpiece. It is not practical to remove the tool measurement apparatus after measuring a tool and such apparatus must therefore be able to withstand the harsh conditions within the machine tool enclosure that occur during processing (e.g., cutting, grinding etc) of a workpiece. In particular, the tool measurement apparatus needs to have resistance against damage from ejected cutting debris (e.g., swarf, chips etc) and exposure to high pressure jets of corrosive liquid coolant.

EP1050368 and EP1502699 describe examples of tool measurement apparatus in which a laser beam is passed from a transmitter portion to a receiver portion via a region of free space. Tool measurements are performed by moving the tool into and/or out of the laser beam whilst measuring the amount of light that passes to the receiver portion. To protect the various optical components of the apparatus, the laser beam enters and exits the device via a narrow channel or conduit in each of the transmitter and receiver portions. Each channel is formed (e.g., by drilling) at an oblique angle to the optical axis along which the laser beam passes between the transmitter and receiver. Air is expelled from the channels and is directed or angled away from the free-space optical path traversed by the laser beam to reduce turbulence effects that could otherwise reduce measurement accuracy. These angled air channels are illustrated in, for example, FIG. 4c of EP1050368 and FIG. 4 of EP1502699.

CN203792103 describes another laser tool setter with a protective window that uses a protective flow of air. Air is supplied to the protective window via a duckbill valve.

It is also known to include a moveable shutter within a tool measurement apparatus to protect the internal optical components. For example, U.S. Pat. No. 10,330,464 describes (e.g., see FIGS. 5 and 6 and the associated description) a spring-loaded, pneumatic closure piston for protecting the laser measuring section of the device when no air is being expelled. Various shutter arrangements for tool measurement apparatus are also described in WO2020/183155 and CN213615607U.

The NC4 non-contact tool setting system is sold by Renishaw plc, Wotton-Under-Edge, UK. This apparatus includes angled air-expulsion apertures of the type described in EP1050368 and EP1502699 in combination with pneumatically activated, spring-return shutters that are provided upstream of the air-expulsion aperture. These shutters block the ingress of debris when the air supply is deactivated, thereby providing protection to the optical components of the apparatus even in the absence of an air supply.

The above-described arrangements provide varying levels of protection against contaminants. The present inventors have, however, found that they do have certain disadvantages, especially when the apparatus is exposed to the harshest conditions found within certain machine tool systems. For example, expelling or bleeding air through an aperture provides a compact solution but this only provides protection whilst a flow of air is being supplied. The use of a pneumatically activated shutter seal can be arranged to provide protection in the absence of an air supply, but such arrangements are not particularly compact and have various moving parts and seals that can become worn over time thereby allowing the ingress of contaminants. The use of a pneumatically activated shutter in combination with an air-bleed aperture as per the above-mentioned NC4 product allows protection to be maintained even in the absence of supplied air, but in harsh conditions contaminants can still enter the apertures when air is not being supplied. Such contaminants can then accumulate within the air channels and/or they can reach the pneumatically activated shutter arrangement thereby degrading or damaging components of the seal.

According to a first aspect of the present invention, there is provided a tool measurement apparatus for a machine tool, comprising;

a transmitter portion including a light source for generating a light beam and a receiver portion including a detector for detecting the light beam, the light beam being passed from the light source to the detector along an optical path, at least one of the receiver portion and the transmitter portion comprising a protection device including a gas expulsion aperture configured to expel a bleed gas supplied from an external gas source, the optical path also passing through the gas expulsion aperture, wherein the protection device further comprises a check valve located in the optical path, the bleed gas is supplied to the gas expulsion aperture through the check valve, and the flow of the bleed gas through the check valve causes the check valve to adopt an open configuration defining a passageway through which the light beam can pass.

A tool measurement apparatus is thus provided which is suitable for the measurement of tools on a machine tool. A beam of light passes from the transmitter portion to the receiver portion along an optical path. The optical path may include a reflection from the tool to be measured. In a preferred embodiment, a break-beam configuration is provided in which a tool to be measured is carried by the machine tool and moved to break a light beam that is arranged to pass (in the absence of a tool) from the light source to the detector. Analysis of the received light intensity at the receiver portion allows a dimension or property of the tool to be measured. The machine tool environment can be harsh (e.g., due to coolant, cutting debris etc) and at least one, or preferably both, of the transmitter and receiver portions include a protection device to help prevent the ingress of contaminants. In particular, light may exit (for the transmitter portion) and/or enter (for the receiver portion) the apparatus via a gas expulsion aperture through which a flow of gas (e.g., air) is also passed. This gas expulsion or gas bleed helps prevent the ingress of contaminants from the machining process into the apparatus through the gas expulsion aperture(s).

In addition to providing a gas bleed, the protection device also includes a check valve for protecting against the ingress of contaminants when no gas is being expelled through the gas expulsion apertures. The check valve, which in a preferred embodiment is a duckbill valve or the like, is located within the respective transmitter and/or receiver portions in the optical path of the light beam. The check valve, which may also be termed a one-way valve, is configured to open (i.e., adopt an open configuration) when a flow of gas passes through it towards the gas expulsion aperture. Such a check valve does not require the use of actuators or other associated means to force it open; the air flow through the check valve alone provides the force that causes it to open. In this open configuration, a passageway through the check valve is present that the light beam can also pass through. In the absence of such a gas flow, the check valve closes and as explained below it can then provide a fluid tight seal. This prevents external contaminants, such as jets of pressurised coolant fluid or cutting debris directed at the gas expulsion aperture, passing through the check valve.

The tool measurement apparatus of the present invention has various advantages over prior art tool measurement apparatus. For example, the check valve can be considerably smaller than the piston-activated shutter arrangements of the prior art. This allows the check valve to be placed much closer to the gas expulsion aperture than a shutter arrangement thereby reducing the depth of penetration of contaminants into the apparatus. In a preferred embodiment, the check valve can be placed downstream (from a bleed gas perspective) of the various optical components (including any optical aperture) of the transmitter and/or receiver portion and can thus help prevent contaminants from reaching any of these optical components. As explained below, the check valve is also typically a low-cost item that in one embodiment can be easily replaced if it becomes damaged or worn. In this manner, an improved tool measurement apparatus is provided.

Advantageously, the check valve of the protection device adopts a closed configuration when no bleed gas is being supplied to its gas expulsion aperture. The closed configuration of the check valve may thus provide a seal that substantially prevents the ingress of fluid or cutting debris from the machine tool environment. In other words, the closed check valve will conveniently block the onward passage of most fluid (or other contaminants) that may enter the gas expulsion aperture when there is no bleed gas being expelled through that aperture. Application of a negative gas pressure may be used to more tightly close the check valve. Similarly, any external gas pressure (i.e. that would result in a backflow of gas in the absence of the check valve) may help to more tightly close the check valve. The check valve may also substantially block the passage of the light beam along the optical path when in the closed configuration. The tool measurement apparatus may thus not be usable for measurement when no bleed gas is being supplied. In other words, the closed check valve may provide a passive protection mode in which use of the apparatus for measurement is not possible.

Advantageously, the check valve comprises a duckbill valve. As explained below, a duckbill valve typically includes two or more flexible lips. Such lips may be provided, for example, by a suitable slitted surface or a plurality of resiliently flexible flaps. Such lips may be shaped like the beak (bill) of a duck. The flexible lips part to provide an open passageway when gas is passed through the valve in a first direction. The lips do not part, but instead stay sealed, in the absence of any gas flow or when a gas flow is directed in the opposite direction to the first direction. The duckbill valve thus acts as a one-way or check valve that prevents fluid backflow. The duckbill valve is arranged to open when gas is passed through it in a direction towards the associated gas expulsion aperture. The gas thus flows through the duckbill valve from a gas inlet or other conduit within the apparatus and exits via the gas expulsion aperture. A gas supply unit may also be provided to supply such a flow of gas to the inlet. The duckbill valve may be formed from an elastomer material (e.g., silicone, Fluorocarbon or a hydrocarbon resistant fluorosilicone rubber). The duckbill valve may include a first end that includes a flange and flexible (e.g., elastomeric) lips that extend from the flange. The duckbill valve may be located in a housing within the transmitter/receiver portion that retains the flange and restricts the outward deflection of the flexible members. Although a duckbill valve is preferred, it should be noted that any check valve may be used that provides a passageway for a light beam when it is in its open configuration. For example, a cross-slit valve, a gate valve or a reed valve would be suitable.

Advantageously, the gas expulsion aperture of the protection device comprises a conduit that is obliquely angled with respect to the optical path such that the expelled bleed gas is directed away from the optical path. This reduces turbulent gas flow along the free space portion of the optical path which could otherwise introduce measurement uncertainty. The conduit may also be appropriately sized so as to not interact with the light beam that passes through it.

As explained above, the transmitter portion and the receiver portion may be arranged in a break-beam configuration in which the optical path passes from the light source to the detector through a region of free space into which a tool can be placed to obscure the light beam. For example, the light source may direct the beam of light along a linear optical path that is arranged to coincide with the detector. A tool to be measured may then be arranged to occlude the light beam (i.e., enter the optical path) in a region of free space located between the transmitter and receiver portions. The tool "breaking" the beam of light thus alters the amount of light reaching the detector. Alternatively, the beam of light may be reflected from a tool to be measured. In such an example, the receiver portion may be located to collect light emitted from the transmitter portion that has been reflected from the tool. In such an example, the optical path includes reflection from the tool. The transmitter and receiver portions may be co-located, or even incorporated into the same unit, in such a reflective arrangement.

The transmitter portion may include the protection device. The receiver portion may include the protection device. In a preferred embodiment, both the transmitter portion and the receiver portion include protection devices. The transmitter portion may thus comprise a protection device and the receiver portion may also comprise a (different) protection device. References to "the protection device" herein thus include references to one, or each, protection device of the apparatus as appropriate. In other words, in a preferred embodiment the apparatus preferably comprises two protection devices. The transmitter portion may comprise a first protection device and the receiver portion a second protection device. The first and second protection devices of the transmitter and receiver portions are preferably identical (e.g., interchangeable) for simplicity. The first and second protection devices of the transmitter and receiver portions could, however, be different. For example, the size or angle of the gas expulsion aperture or the size or type of check valve may be different for the protection devices of the transmitter and receiver portions. Each of the first and second protection device may have any, or all, of the features of the protection device described herein.

In a preferred embodiment, at least one of the transmitter portion and the receiver portion comprises an optical aperture for defining a dimension of the light beam. Both the transmitter portion and the receiver portion may include such an optical aperture. The optical aperture may be dimensioned to control a property of the light passing through it. For example, a circular optical aperture may be provided to control the diameter of the light beam and/or to stop stray light entering the optical systems of the transmitter and/or receiver portions. In such an example, even minor contamination of the optical aperture may degrade measurement accuracy (e.g., by occluding, diverting or reflecting the light beam). It is thus preferred that such an optical aperture is provided upstream of the protection device. In other words, the check valve (when closed) preferably protects the optical aperture from external contaminants.

The protection device(s) of the transmitter and/or receiver portions may alone provide a seal to contaminants in the absence of a gas flow through the gas expulsion aperture. Alternatively, at least one of the transmitter portion and the receiver portion may further comprise a shutter assembly moveable between an open position and a closed position. The shutter assembly may be provided upstream (from a bleed gas perspective) of the protection device. In other words, a shutter assembly may be provided behind the, or each, protection device. The shutter assembly may thus provide a secondary seal to stop the ingress of contaminants that have somehow passed the check valve of the protection device (e.g., if the check valve was to become damaged or worn). The transmitter and/or receiver portions may also include further check valves (e.g., further duckbill valves) in additional to those of the protection device(s). For example, a series of such check valves may be provided within the transmitter or receiver portions along the optical beam path.

In a preferred embodiment, a shutter assembly and an optical aperture are both provided. The shutter assembly is preferably located upstream of the optical aperture. The optical aperture may thus be located between the protection device and the shutter assembly. The protection device thus protects the optical aperture from contaminants entering the gas expulsion aperture, but the optical aperture is located in front of the shutter assembly (and hence no protection of the optical aperture from external contaminants is provided by the shutter assembly). The shutter assembly thus provides additional protection to certain optical components (e.g., the detector or light source) that are deeper within the apparatus, but protection of the optical aperture is provided by the protection device alone.

Advantageously, at least one of the transmitter portion and the receiver portion comprise a baffle external to the gas expulsion aperture of the protection device. As would be understood by a person skilled in the art, a baffle in the present context means a device (e.g., a plate, wall, or screen etc) to deflect the passage of a fluid (such as a stream of coolant liquid). Preferably both the transmitter portion and the receiver portion comprise such a baffle. The baffle is conveniently arranged to protect the gas expulsion aperture from the ingress of fluid or debris without obstructing the optical path. In other words, each baffle is designed and located so that it does not obscure the beam path but deflects incident fluid away from the gas expulsion aperture. The baffle may partially surround the gas expulsion aperture. The baffle may comprise a partial cone. For example, a baffle comprising a segment or section of a cone may be located to protect the gas expulsion aperture. The bleed gas expelled from the gas expulsion aperture is preferably directed away from the baffle. This prevents the baffle redirecting the bleed gas towards the optical path, which could introduce turbulence.

The apparatus may be formed as a unitary (integrally formed) item that is not intended to be, or capable of being, disassembled after manufacture. Advantageously, at least one of the transmitter portion and the receiver portion comprise a removable cap portion that incorporates the protection device. In other words, a removable cap portion may incorporate the protection device, the removable cap portion being attachable to the body of at least one of the transmitter portion and the receiver portion. Two such removable cap portions may be provided for attachment to each of the transmitter and receiver portions. The, or each, removable cap portion may also incorporate the optional baffle and/or the optional optical aperture described above. In such an example, the cap portion can be removed and replaced from the apparatus as required. For example, a variety of different cap portions may be provided for different measurement configurations (e.g. to provide differently sized optical beams, different amounts of gas bleed, differently shaped or orientated baffles etc). It would also be possible to remove the cap portion for replacement or repair purposes. For example, the check valve may become worn or damaged over time and it could then be easily replaced when required by changing the cap portion (i.e., replacing the entire cap portion with a replacement cap portion) or by removing the cap portion to replace/repair the check valve. This is especially advantageous when using a duckbill valve or a similar check valve that is made from an elastomeric material.

A machine tool may also be provided that includes the above-described tool measurement apparatus. In other words, a machine tool in combination with the above-described tool measurement apparatus may be provided. For example, the tool measurement apparatus may be mounted to a bed of the machine tool.

Also described herein is a protection device for a tool measurement apparatus. The protection device comprises a gas expulsion aperture and a check valve, wherein a flow gas passed in a first direction through the check valve causes the check valve to adopt an open configuration defining a passageway through which a light beam can pass. The protection device may include any of the features described above in connection with the tool measurement apparatus. The protection device may also comprise an attachment mechanism configured to allow the protection device to be releasably attached to the housing of the transmitter portion or receiver portion, as appropriate, of a tool measurement apparatus.

Also described herein is a tool measurement apparatus for a machine tool, comprising a transmitter portion for generating a light beam and a receiver portion for detecting the light beam, the light beam being passed from the transmitter portion to the receiver portion along an optical path (e.g., into which a tool can be inserted), wherein at least one check valve is located in the optical path. The check valve is preferably configured to adopt an open configuration when a flow of gas is passed therethrough, the open configuration of the check valve defining a passageway through which the light beam can pass. The apparatus may include any of the other features described above.

Also described herein is a tool measurement apparatus for a machine tool. The tool measurement apparatus may comprise a non-contact tool setter. The apparatus may comprise a transmitter portion. The transmitter portion may include a light source for generating a light beam. The apparatus may comprise a receiver portion. The receiver portion may include a detector for detecting the light beam. The light beam may be passed from the light source to the detector along an optical path. A tool may be insertable in the optical path. The receiver portion and/or the transmitter portion may comprise a protection device. The protection device may include a gas expulsion aperture. The gas expulsion aperture may be configured to expel a bleed gas that is supplied to the apparatus from an external gas source. The optical path may pass through the gas expulsion aperture. The protection device may comprise a check valve. The check valve may be located in the optical path. The bleed gas may be supplied to the gas expulsion aperture through the check valve. The flow of the bleed gas through the check valve may cause the check valve to adopt an open configuration (i.e., the check valve may be a flow-activated check valve). The open configuration may define a passageway through which the light beam can pass. The apparatus may include any of the other features described above.

The invention will now be described, by way of example only, with reference to the accompanying drawings in which.

Figure 1:
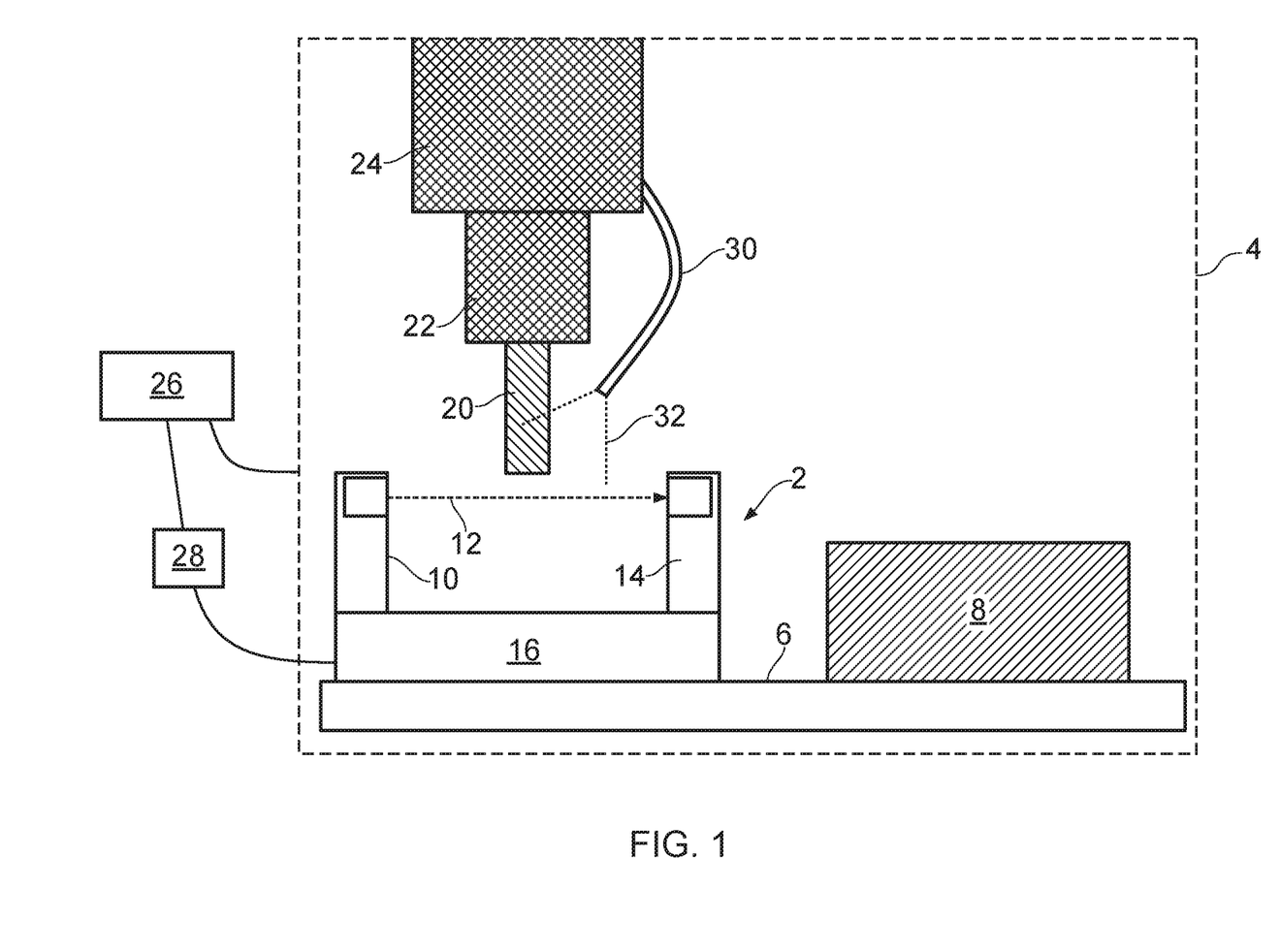
FIG. 1 illustrates a laser tool setter apparatus mounted within a machine tool enclosure.

Referring to FIG. 1, there is provided a schematic illustration of a (non-contact) laser tool setter 2 located within a machine tool enclosure 4. In particular, the laser tool setter 2 is mounted to the bed 6 of the machine tool adjacent to a workpiece 8 that is to be processed (cut).

The laser tool setter 2, which is an example of a tool measurement apparatus, comprises a transmitter portion 10 that includes a laser diode and suitable optics (not shown) for generating a beam of light 12. A receiver portion 14 is spaced apart from the transmitter portion 10 and includes a photodiode and suitable optics (not shown) that are arranged to receive the beam of light 12. In the illustrated arrangement, the transmitter portion 10 and the receiver portion 14 are both affixed to a common base 16 and thus maintain a fixed spacing and orientation relative to one another. The base 16 is securely mounted (e.g., bolted) to the machine tool bed 6. Other configurations of the device would also be possible. For example, a single (common) housing for the transmitter and receiver could be provided or discrete transmitter and receiver units could be separately mounted to the machine tool. The laser tool setter 2 could also be mounted to other parts of the machine tool; e.g., to the casing of the machine tool or to a moveable tool setting arm etc.

The laser tool setter 2 is arranged so that the light beam 12 passes from the transmitter portion 10 to the receiver portion 14 through a region of free space. A tool 20 attached to a tool shank 22 carried by a moveable spindle 24 of the machine tool can then be moved so as to obstruct the light beam 12. In particular, the spindle 24 can be moved relative to the bed 6 under the control of the machine tool controller 26. The detector of the receiver portion 14 measures the intensity of light that passes to it from the transmitter portion and a beam intensity signal is passed to a tool setter interface 28 for analysis. The interface 28 comprises a processor that analyses the beam intensity signal and generates a so-called "trigger signal" when the intensity of received light crosses a certain threshold (e.g., 50%). This trigger signal is passed to the SKIP input of the machine controller 26. The position of the tool, as measured by the machine tool, is captured on receipt of the trigger signal from the interface 28 thereby allowing a tool size (e.g., tool length or diameter) measurement to be made. It should be noted that the trigger signal may be output in a plurality of different ways, depending on the configuration of the controller 26. For example, the trigger signal may be communicated by latching the voltage of a line connected to a SKIP input of the controller 26 or by generating a pulse or series of pulses that are passed to that SKIP input. The trigger signal may alternatively be passed to the controller 26 over a digital data bus (e.g., as described in WO2018/134585).

The laser tool setter 2 allows various tools, such as tool 20, to be measured prior to their use in a cutting procedure. The subsequent cutting procedure involves bringing such tools, for example rotating drills or milling tools, into contact with the workpiece 8 to perform the required cutting operation. A coolant pipe 30 may be carried by the spindle that can direct a spray or jet of coolant within the illustrated cone 32 towards the tip of the tool 20. The coolant spray would typically only be activated during cutting to drench the workpiece 8, but the tool setter 2 would then be subjected to splashes, reflected coolant jets and cutting debris. This is especially the case if the tool setter 2 has to be mounted in close proximity to the workpiece 8, as is the case in some machine tool setups.

Figure 2:
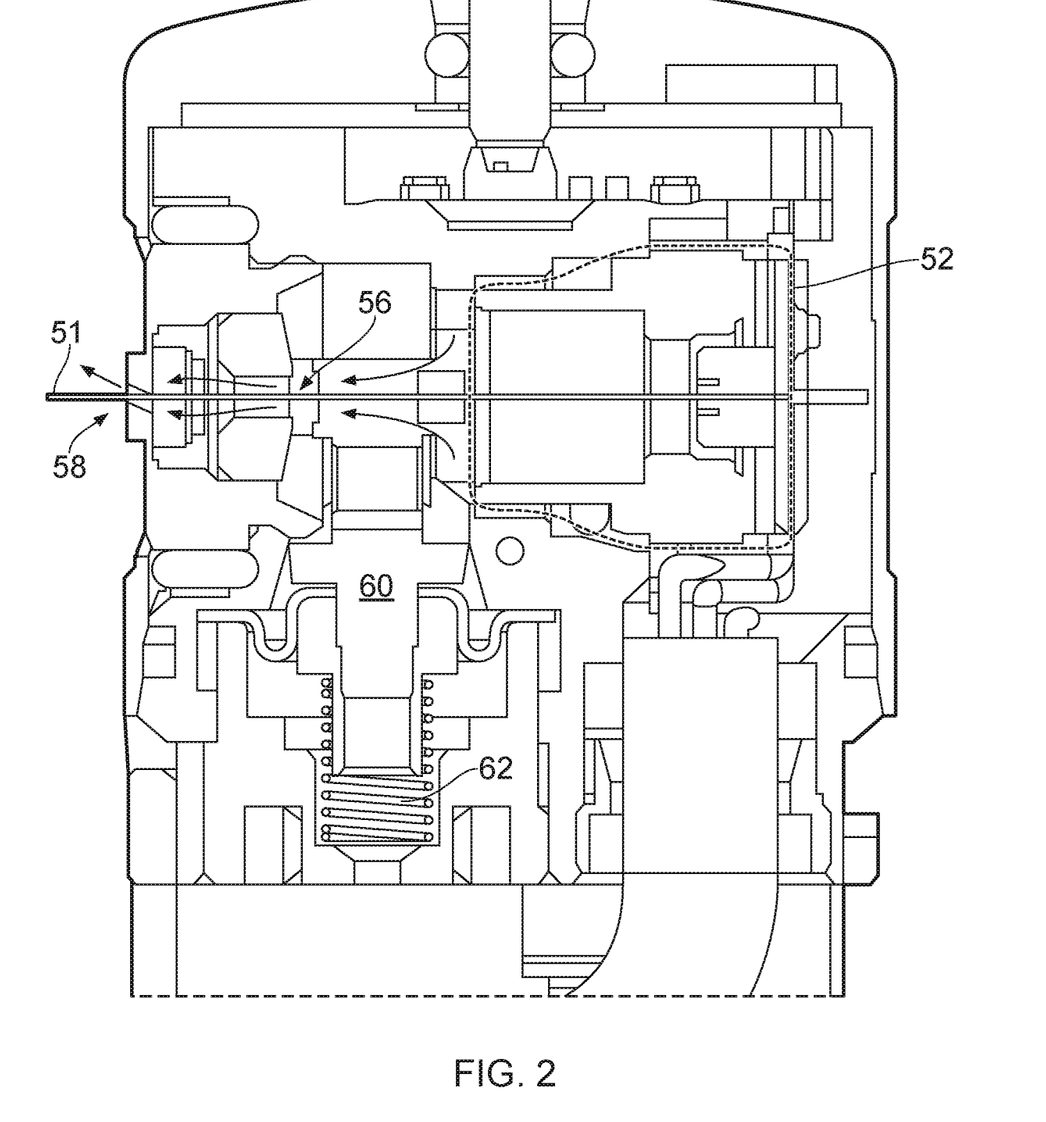
FIG. 2 shows a prior art protection device of the type used in the Renishaw NC4 product.

Referring to FIG. 2, a cut-way view is provided of the transmitter portion 50 of the prior art NC4 tool setter mentioned above.

A laser module 52 includes a laser diode and optics that generated a collimated light beam 51. Although a collimated light beam 51 is shown, focusing elements may alternatively be provided to generate a focused light beam. The light beam passes through an optical aperture 56 (which defines the diameter of the light beam 51) and exits the transmitter portion 50 via an angled air expulsion aperture 58. The interior of the transmitter portion 50 is arranged to include channels that direct a flow of air from an external compressed air supply through and around the optical aperture 56 so that it exits the device via the air expulsion aperture 58. The supply of compressed air also acts on a pneumatic actuator (piston) mechanism that moves a shutter 60 out of the optical pathway against the return force of a compression spring 62. In the absence of a compressed air supply, the spring 62 causes the shutter 60 to move upwards thereby sealing the hollow channel through the transmitter portion. This shutter seal and actuator arrangement is provided to prevent contaminants from reaching the laser module 52.

Although the above-described NC4 tool setting system has been found to provide highly robust, market-leading protection against contaminants with or without the supply of compressed air being activated, it can still have disadvantages when used in the most extreme of conditions. In particular, coolant and debris can enter the air expulsion aperture 58 when no air is being supplied and this can accumulate in parts of the channels that are located in front of the shutter 60. Although the majority of this contamination is expelled from the device when the air supply is next activated and the shutter 60 opens, there can be some accumulation of debris over time. This may include contaminants reaching and damaging components of the shutter 60 and associated actuator or reaching the laser module 52. There can thus be a degradation of optical performance and/or of the seal provided by the shutter 60 over time, which requires the apparatus to be disassembled and cleaned. It should be noted that although a transmitter portion is illustrated in FIG. 2, a similar issue can also arise with the corresponding receiver portion.

Figure 3:
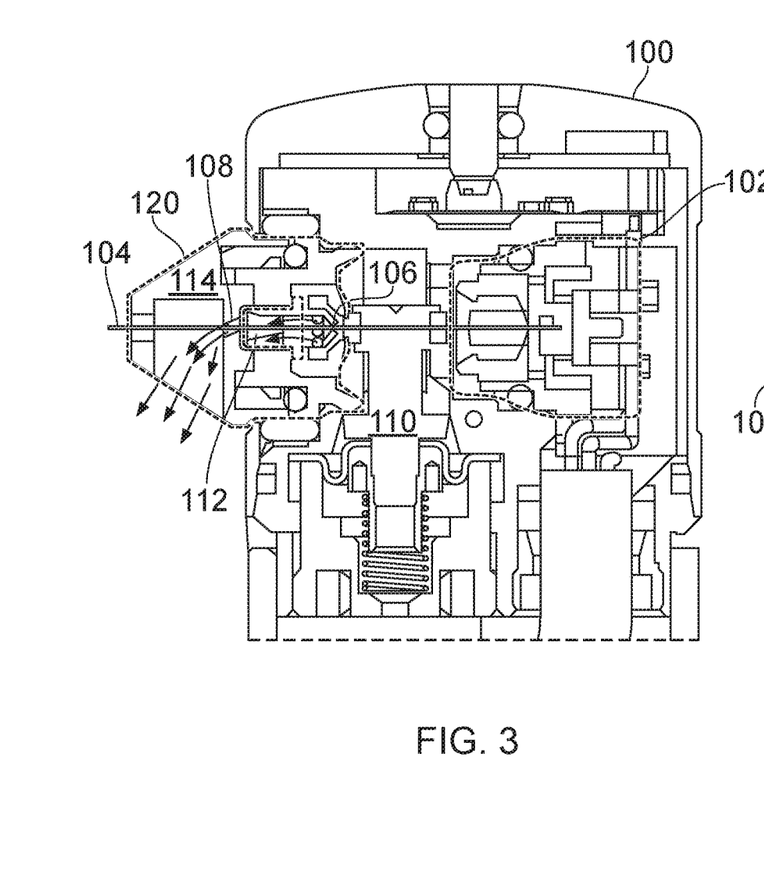
FIG. 3 shows a cut-through image of a tool setter apparatus including a protection device of the present invention, FIG. 4 show an expanded view of the protection device of the apparatus of FIG. 3, FIGS. 5A and 5B schematically illustrate a duckbill valve in the closed and open configurations respectively.
Figure 4:
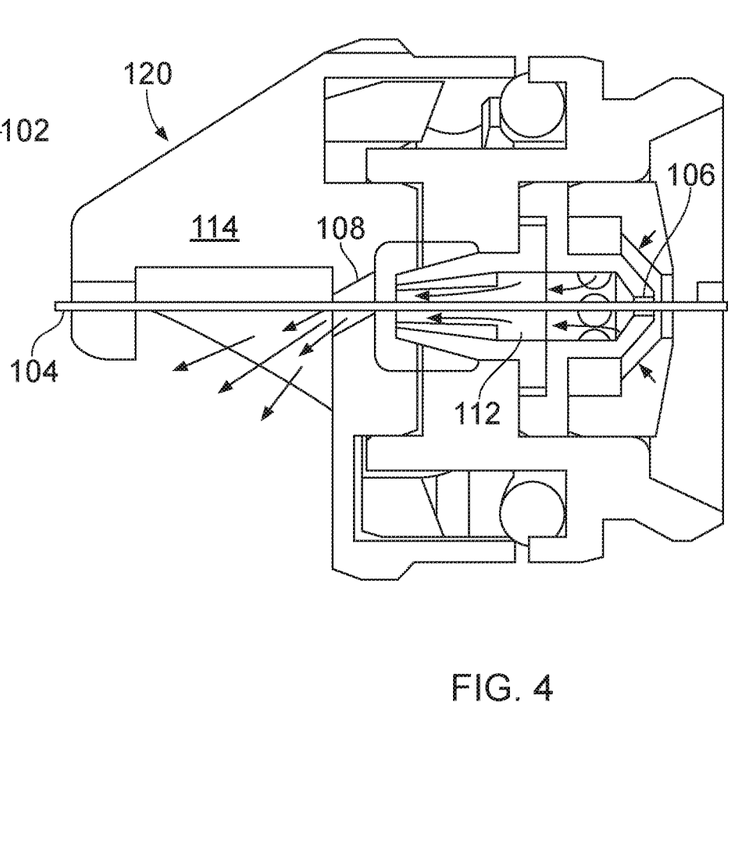

Referring next to FIGS. 3 and 4, a transmitter portion 100 in accordance with the present invention is illustrated. As shown in FIG. 3, and in common with the prior art transmitter portion 50 described above, a laser module 102 is provided that generates a light beam 104 that passes through an optical aperture 106 and exits the transmitter portion via an air expulsion aperture 108. A pneumatically-activated shutter 110 is also provided between the optical aperture 106 and the laser module 102.

The transmitter portion 100 additionally includes a duckbill valve 112 located in the optical path in-between the air expulsion aperture 108 and the optical aperture 106. An external baffle 114 is also provided to help deflect incident contaminants (e.g., streams of coolant) away from the air expulsion aperture 108. The complete arrangement of the transmitter portion is shown in FIG. 3, whilst FIG. 4 shows a protective cap portion 120 that can be detached from the remainder of the transmitter portion. In this example, the protective cap portion 120 comprises the baffle 114, the air expulsion aperture 108, the duckbill valve 112 and the optical aperture 106. Removal of the protective cap portion 120 allows the inside of the remainder of the transmitter portion 100 to be cleaned. The whole protective cap portion 120 (or just the duckbill valve 112 within the protective cap portion 120) can also be replaced if it becomes worn or damaged.

During measurement, a supply of compressed air is introduced into the apparatus. This air is passed through the duckbill valve 112 and exits the transmitter portion 100 via the air expulsion aperture 108. As will be explained below, the duckbill valve 112 comprises a resiliently flexible plastic tube with lips or flaps (having the general shape of a duckbill) that expand (open) when there is a flow of air passing through it in one direction (i.e., in the direction out of the apparatus). The arrangement is such that the light beam 104 can also pass through the duckbill valve 112 when its internal passageway is opened by the flow of compressed air. The compressed air supply also actuates the piston actuator to move the shutter 110 and thereby uncover the laser module 102. The light beam 104 is thus unobstructed when there is a flow of compressed air through the transmitter portion and out of the air expulsion aperture 108. This air flow or air bleed, when activated, also inhibits contaminants from entering the air expulsion aperture 108. It should be noted that appropriate alignment of the angled conduit that forms the air expulsion aperture 108 causes the bleed air to be directed away from the external baffle 114 to minimise any air turbulence along the free-space part of the optical path. The apparatus may also include a suitable air inlet for receiving air (or any suitable gas) from an external supply (e.g., from a compressed air supply).

In the absence of compressed air being supplied to the transmitter portion 100, the shutter 110 seals the laser module 102 and the passageway through the duckbill valve 112 also closes (i.e., the lips at the end of the resiliently flexible plastic tube close and the valve thus seals itself). It can thus be seen that two different protective seals are provided within the optical pathway. The duckbill valve 112 is located immediately behind the air expulsion aperture 108 and when it is sealed due to the absence of an air flow it acts to protect the optical aperture 106 from contaminants. Further protection of the laser module 102 is provided by the shutter 110. This dual-seal arrangement reduces the ability for contaminants to penetrate the air supply channels within the transmitter portion 100 thereby giving improved protection against the ingress of contaminants. The compactness of the duckbill valve 112 also means it can be placed closer to the air-expulsion aperture than the relatively larger shutter 110 arrangement and thereby reduces the depth of contaminant penetration in the apparatus. Again, although only the transmitter portion is described a similar arrangement is also used in the receiver portion.

Although the described dual-seal arrangement has been found to provide good protection, it would be possible to omit the shutter 110 and rely only on the duckbill valve 112 to prevent contamination entering the apparatus when no air supply is present. In such an example, it would be possible to provide a much more compact tool setter device. It should also be remembered that these examples are non-limiting, and that various other alternatives and variants would be possible. For example, the external baffle could be omitted, the air expulsion aperture could be sized to also provide an optical aperture, the collimated laser beam could be replaced by a focused laser beam etc.

Figure 5A:
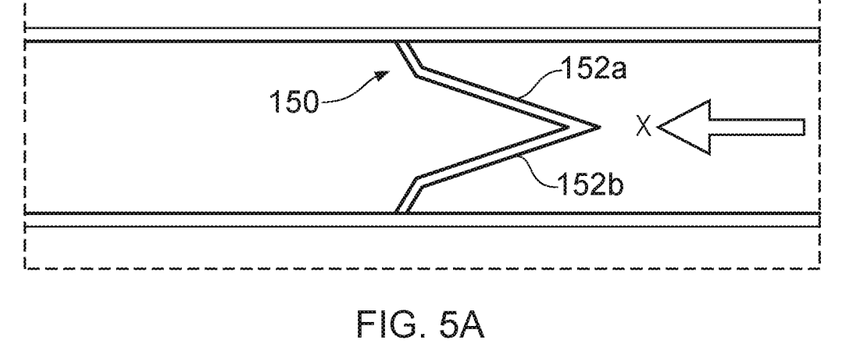
Figure 5B:
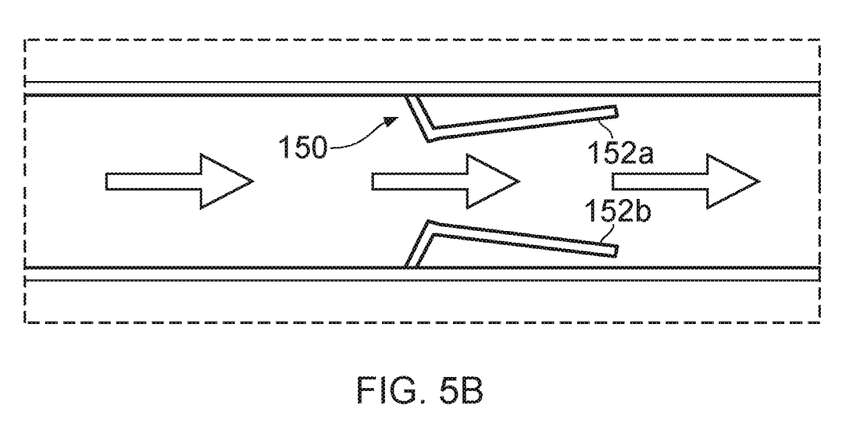

Referring next to FIGS. 5A and 5B, the principle of operation of a duckbill valve will be explained in more detail. A duckbill valve is an example of a check valve and is typically manufactured from rubber or synthetic elastomer. A duckbill valve usually has two or more lips or flaps, that are usually shaped like the beak of a duck.

FIG. 5A shows a duckbill valve 150 formed from two flaps 152a and 152b that is in the closed configuration. In this configuration, there is no fluid flow from left to right in the diagram and the elasticity of the two flaps 152a and 152b causes them to remain flattened and engaged with one another. This provides a fluid seal that prevents any fluid flow from right-to-left in FIG. 5A.

FIG. 5B shows the duckbill valve 150 in the open configuration. This open configuration is adopted when there is a flow of fluid through the duckbill valve in one direction (in this example from left-to-right). In particular, when a fluid is pumped from left-to-right as shown in FIG. 5B, the flattened ends of the flaps 152a and 152b of the duckbill deform and open to permit the pressurized fluid to pass.

The duckbill valve 150 thus acts as a check valve or one-way valve. Duckbill valves are often used in medical, fluid control applications to prevent contamination due to backflow. They are also similar in function to the mitral valve found in the heart. In recent years, such duckbill valves have also been used in low-cost food packaging applications. For example, to allow the controlled expulsion of liquids (e.g., ketchup, mustard etc) from plastic bottles.

Figure 6:
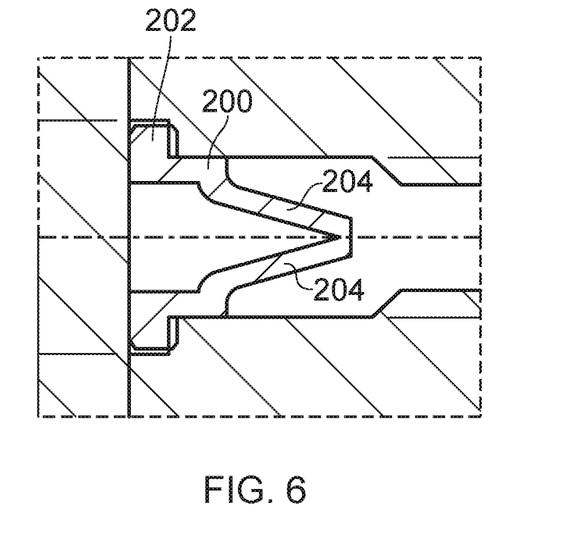
FIG. 6 shows a duckbill valve design that is suitable for use in the apparatus of FIGS. 3 and 4, FIGS. 7A and 7B are images of a duckbill valve in the closed and open configurations respectively.

Referring to FIG. 6, there is illustrated a duckbill valve 200 suitable for use in the above-described tool setter device. The duckbill valve 200 includes a flange 202 and lips 204. The flange 202 allows the valve to be secured within an appropriate recess within the transmitter or receiver portions of the above-described tool setter device. Importantly, the dimensions of the duckbill valve 200 are selected so that, when the valve is opened by supplying a flow of compressed air, the laser beam can pass through the passageway (channel) of the open valve. In particular, the lips 204 are designed to move apart and press against the cavity walls within the transmitter or receiver portion thereby opening up a passageway having a diameter greater than the diameter of the laser beam. In the absence of air flow out of the apparatus, the configuration shown in FIG. 6 is adopted that prevents backflow. The passage of light may also be blocked, at least partially, by the closed valve. The duckbill valve 200 is formed from FKM or similar elastomers.

Figure 7A:
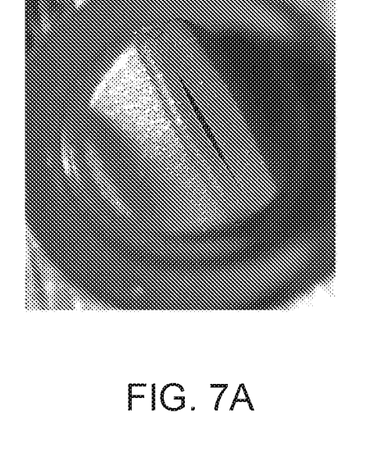

FIG. 7A is an image showing an end-on view of a duckbill valve when no air is being passed therethrough. It can be seen from FIG. 7A that the two lips defining the slit are close to one another (i.e., there is only a small gap between the lips). If a small negative gas pressure was provided inside the device, or if there was pressurised gas attempting to flow back though the valve, these lips would seal more tightly together (i.e., to prevent back-flow of gas through the duckbill valve).

Figure 7B:
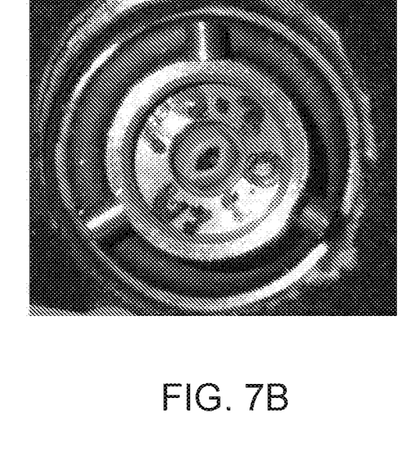

FIG. 7B is an image showing an end-on view of the duckbill valve when air is being passed though it in the direction towards the camera that captured the image. It should be noted that the magnification used to capture image 7B is less than FIG. 7A to allow the structure surrounding the duckbill valve to be visible. It can be seen from FIG. 7B that the lips have parted from one another, and an aperture is present through which a light beam can pass. The aperture is sized to be larger than the light beam and the light beam and valve are positioned such that the light beam is centred on the aperture. A light beam can thus pass unobstructed through the (open) aperture.

It should be noted that it would be possible to tailor the elasticity of the duckbill valve to achieve the desired operational performance (e.g., to control the pressure and/or flow rate of gas required to open the valve). This may be by appropriate material selection and/or by varying the dimension of the valve components etc. Although the above examples illustrate an elastomeric duckbill valve in which the material elasticity alone causes the valve to close in the absence of a gas flow, additional closure elements may also be provided. For example, a return spring or the like may be coupled to the flexible lips of the duckbill valve to provide an additional spring force to close the valve (and thereby requiring additional force from the passage of air to open the valve). Variants of the illustrated duckbill valves may also be used. For example, so-called cross-slit duckbill valves may be employed. Similarly, there are alternative check-valves that allow a similar function to duckbill valves to be implemented. These include reed valves (e.g., formed from flexible metal or composite materials), gate valves, hinged check valves etc.

Figure 8:
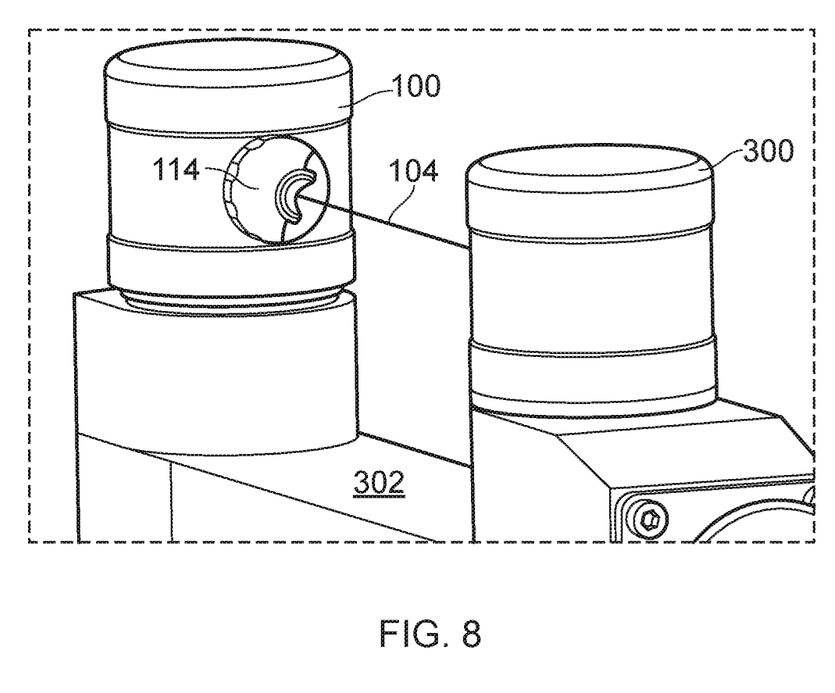
FIG. 8 shows an external, perspective view of the tool measurement apparatus of FIGS. 3 and 4.

Referring to FIG. 8, a perspective view of a tool setter of the present invention is shown. The tool setter includes a transmitter portion 100 as described in detail above and a receiver portion 300. The configuration of the receiver portion 300 is analogous to that of the transmitter portion 100, but it includes a light detector module (e.g., including a photodiode) rather than a laser module. The external baffle 114 of the transmitter portion 100 is visible in the diagram and a similar baffle is also provided on the receiver portion 300 (although this is not visible in the drawing). These baffles are appropriately angled to protect the air expulsion apertures. The transmitter portion 100 and receiver portion 300 are both attached to a base 302 that in turn can be attached to required part of a machine tool. The light beam is passed from the transmitter portion 100 to the receiver portion 300 via a region of free space into which a tool can be placed. Appropriate analysis of the received light signal is used to measure the tool which has been placed in the light beam.

It should again be remembered that the above are merely examples of the present invention and that numerous variants and alternatives are possible. For example, any light source (not just a laser diode) could be used. Similar, the detector need not be a single element photodiode. It would also be possible to use an array of light sensing elements or pixels. For example, a one-dimensional or two-dimensional imaging array could be used. A break-beam device is described, but the protection device could also be incorporated in other tool measurement apparatus, such as reflective tool sensors.

The invention claimed is:

1. A tool measurement apparatus for a machine tool,
the tool measurement apparatus comprising a transmitter portion including a light source for generating a light beam and a receiver portion including a detector for detecting the light beam, the light beam being passed from the light source to the detector along an optical path, and
at least one of the receiver portion and the transmitter portion comprising a protection device including a gas expulsion aperture configured to expel a bleed gas supplied from an external gas source, the optical path also passing through the gas expulsion aperture,
wherein the protection device further comprises a check valve located in the optical path, the bleed gas is supplied to the gas expulsion aperture through the check valve, and the flow of the bleed gas through the check valve causes the check valve to adopt an open configuration defining a passageway through which the light beam can pass.

2. The apparatus according to claim 1, wherein the check valve of the protection device adopts a closed configuration when no bleed gas is being supplied to the gas expulsion aperture, the closed configuration substantially preventing the ingress of fluid or debris from the machine tool environment.

3. The apparatus according to claim 2, wherein the check valve substantially blocks the passage of the light beam along the optical path when in the closed configuration.

4. The apparatus according to claim 1, wherein the check valve comprises a duckbill valve having a plurality of flexible lips.

5. The apparatus according to claim 1, wherein the gas expulsion aperture of the protection device comprises a conduit that is obliquely angled with respect to the optical path such that the expelled bleed gas is directed away from the optical path.

6. The apparatus according to claim 1, wherein the transmitter portion and the receiver portion are arranged in a break-beam configuration in which the optical path passes from the light source to the detector through a region of free space into which a tool can be placed to obscure the light beam.

7. The apparatus according to claim 1, wherein each of the transmitter portion and the receiver portion include the protection device.

8. The apparatus according to claim 1, wherein at least one of the transmitter portion and the receiver portion comprise an optical aperture for defining a dimension of the light beam, the optical aperture being provided upstream of the protection device.

9. The apparatus according to claim 1, where at least one of the transmitter portion and the receiver portion further comprise a shutter assembly moveable between an open position and a closed position, the shutter assembly being provided upstream of the protection device.

10. The apparatus according to claim 9 when at least one of the transmitter portion and the receiver portion comprise the optical aperture for defining the dimension of the light beam, wherein the optical aperture is located between the shutter assembly and the protection device.

11. The apparatus according to claim 1, wherein at least one of the transmitter portion and the receiver portion comprise a baffle external to the gas expulsion aperture of the protection device, the baffle being arranged to protect the gas expulsion aperture from the ingress of fluid or debris without obstructing the optical path.

12. The apparatus according to claim 11, wherein the bleed gas expelled from the gas expulsion aperture is directed away from the baffle.

13. The apparatus according to claim 1, wherein a removable cap portion incorporates the protection device, the removeable cap portion being attachable to the body of at least one of the transmitter portion and the receiver portion.

14. A machine tool in combination with a tool measurement apparatus according to claim 1.

\* \* \* \* \*